US007640736B2

(12) United States Patent
Arbel et al.

(10) Patent No.: US 7,640,736 B2
(45) Date of Patent: Jan. 5, 2010

(54) SELF-CONTAINED HYDRAULIC ACTUATOR SYSTEM

(75) Inventors: Aviram Arbel, Hod Hasharon (IL); Alexandru Cohn, Kiryat Ono (IL)

(73) Assignee: Ashradan Holdings Ltd., Tel Aviv (IL)

( * ) Notice: Subject to any disclaimer, the term of this patent is extended or adjusted under 35 U.S.C. 154(b) by 400 days.

(21) Appl. No.: 11/772,251

(22) Filed: Jul. 2, 2007

(65) Prior Publication Data

US 2008/0010984 A1 Jan. 17, 2008

Related U.S. Application Data

(63) Continuation-in-part of application No. 11/186,946, filed on Jul. 22, 2005, now Pat. No. 7,249,458.

(51) Int. Cl.
*F16D 31/02* (2006.01)

(52) U.S. Cl. .............................. 60/473; 60/415; 60/476

(58) Field of Classification Search ................... 60/473, 60/475, 415, 476, 464, 478, 393, 434
See application file for complete search history.

(56) References Cited

U.S. PATENT DOCUMENTS

| | | | | |
|---|---|---|---|---|
| 3,902,318 | A * | 9/1975 | Becker et al. | 60/388 |
| 5,144,801 | A * | 9/1992 | Scanderbeg et al. | 60/475 |
| 5,181,380 | A * | 1/1993 | Favre et al. | 60/405 |
| 6,494,039 | B2 * | 12/2002 | Pratt et al. | 60/368 |
| 6,519,939 | B1 * | 2/2003 | Duff | 60/473 |

* cited by examiner

*Primary Examiner*—Igor Kershteyn
(74) *Attorney, Agent, or Firm*—Mark M. Friedman

(57) ABSTRACT

The hydraulic linear actuator system of the present invention includes a pump that is configured to rotate in a single direction at a substantially constant velocity. Both the direction and flow rate of fluid through the system is controlled by adjusting the positional relationship between the stator and the rotor of the pump. This positional relationship is adjustable between a forward flow state, a non-flow state and a reverse flow state. The hydraulic linear actuator is responsive to the flow of fluid through the system so as to be displaced in a first direction by the forward flow state of the pump and in a second direction by the reverse flow state of the pump.

10 Claims, 9 Drawing Sheets

SELF-CONTAINED HYDRAULIC ACTUATOR SYSTEM

This is a Continuation-In-Part of, and therefore claims priority from, application Ser. No. 11/186,946 filed 22 Jul. 2005.

FIELD AND BACKGROUND OF THE INVENTION

The present invention relates to self-contained actuator systems and, in particular, it concerns a self-contained hydraulic linear actuator system having a pump, the pumping assembly of which is adjustable so as to control the speed and direction of the fluid flow through the system and a linear actuator responsive to the fluid flow.

Self-contained hydraulic actuator systems having closed hydraulic systems incorporating bi-directional pumps are known in the art. Heretofore, these systems required bi-directional motors to drive the pump. Therefore, the speed and direction of pump rotation, and thus fluid flow through the system, is the direct result of the movement of the motor driving the pump. The motors best suited for this purpose are electrical servomotors, which provide the ability to change speed and direction quickly as required. This is particularly relevant in the field of motion simulation.

There are a number of drawbacks associated with the use of servomotors to drive bi-directional pumps. One major drawback is that bi-directional servomotors are expensive since they must be built to perform, and withstand the rigors of, substantially instantaneous changes of speed and/or direction numerous times during the performance of a task.

There is therefore a need for a self-contained hydraulic linear actuator system having a pump, the pumping assembly of which is adjustable so as to control the speed and direction of the fluid flow through the system and a linear actuator responsive to the fluid flow. It would be advantageous if the system included a closed hydraulic system.

SUMMARY OF THE INVENTION

The present invention is a self-contained hydraulic linear actuator system having a pump, the pumping assembly of which is adjustable so as to control the speed and direction of the fluid flow through the system and a linear actuator responsive to the fluid flow.

According to a further teaching of the present invention, a self-contained hydraulic actuator system comprising; a) a drive motor configured to rotate at a substantially constant velocity; b) a hydraulic pump driven by the drive motor; c) a hydraulic linear actuator in fluid communication with the hydraulic pump so as to be actuated in a first direction by a forward flow state and in a second direction by a reverse flow state; d) a control system associated with the hydraulic pump, the control system configured to control adjustment of the hydraulic pump between the forward flow state, a non-flow state and the reverse flow state, and the control system includes a bi-directional motor such that a speed and direction of the adjustment is affected by the bi-directional motor; and e) a positioning system configures to provide positional information regarding the hydraulic linear actuator.

According to a further teaching of the present invention, the hydraulic pump includes a controllably variable pumping assembly such that the adjustments includes a variation of the controllably variable pumping assembly.

According to a further teaching of the present invention, the hydraulic pump includes a stator and a rotor deployed within the stator and the variation of the controllably variable pumping assembly includes adjusting the positional relationship between the stator and the rotor.

According to a further teaching of the present invention, the hydraulic pump is a vane pump.

According to a further teaching of the present invention, the positioning system includes a position feedback system configured to provide position information regarding the hydraulic linear actuator.

According to a further teaching of the present invention, the position feedback system includes at least one of an optical encoder and a linear potentiometer associated with the actuator.

According to a further teaching of the present invention, the fluid communication between the hydraulic pump and the actuator is via a closed hydraulic system.

According to a further teaching of the present invention, there is also provided: a) a fluid expansion reservoir; and b) a valve configuration configured so as to maintain fluid communication between the fluid expansion reservoir and a downstream port of the hydraulic pump.

According to a further teaching of the present invention, the hydraulic pump is configured with first and second ports, and the first and second ports alternately act as upstream and downstream ports such that when the first port acts as the upstream port the second port acts as the downstream port, and when the first port acts as the downstream port the second port acts as the upstream port, therefore, the valve configuration maintains the fluid communication between the fluid expansion reservoir and one of the first and second ports, dependent on which of the first and second ports is acting as the downstream port.

According to a further teaching of the present invention, the fluid expansion reservoir is not vented.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
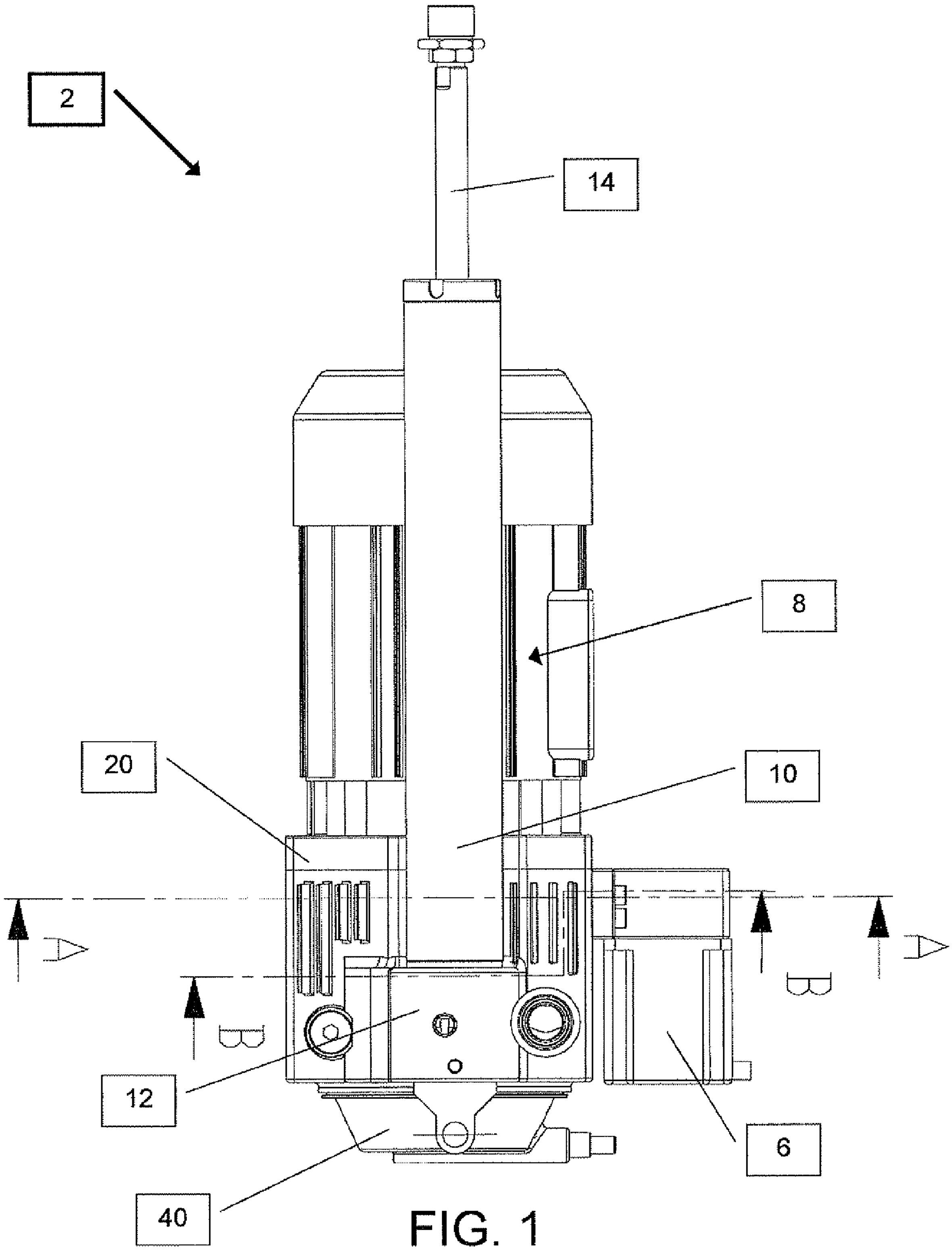
FIG. 1 is a side elevation of a preferred embodiment of a self-contained hydraulic linear actuator system constructed and operative according to the teachings of the present invention.

The present invention is a self-contained hydraulic linear actuator system having a pump, the pumping assembly of which is adjustable so as to control the speed and direction of the fluid flow through the system and a linear actuator responsive to the fluid flow.

The principles and operation of a self-contained hydraulic linear actuator system according to the present invention may be better understood with reference to the drawings and the accompanying description.

By way of introduction, the hydraulic linear actuator system of the present invention includes a pump that is configured to rotate in a single direction at a substantially constant velocity. Therefore, the drive motor that drives the pump can be a single direction constant velocity motor such as is known in the art, rather than a bi-directional variable speed servomotor. This gives the hydraulic linear actuator system of the present invention a substantial cost advantage over systems that employ a more expensive bi-directional variable speed servomotor.

Both the direction and flow rate of fluid through the system is controlled by adjusting the configuration of the pump, which is adjustable between a forward flow state, a neutral non-flow state and a reverse flow state. The hydraulic linear actuator is responsive to the flow of fluid through the system so as to be displaced in a first direction by the forward flow state of the pump and in a second direction by the reverse flow state of the pump.

It should be noted that the use of the terms “clockwise,” “counter-clockwise,” “left” and “right”, are used herein with reference to direction as seen in the drawings.

Figure 2:
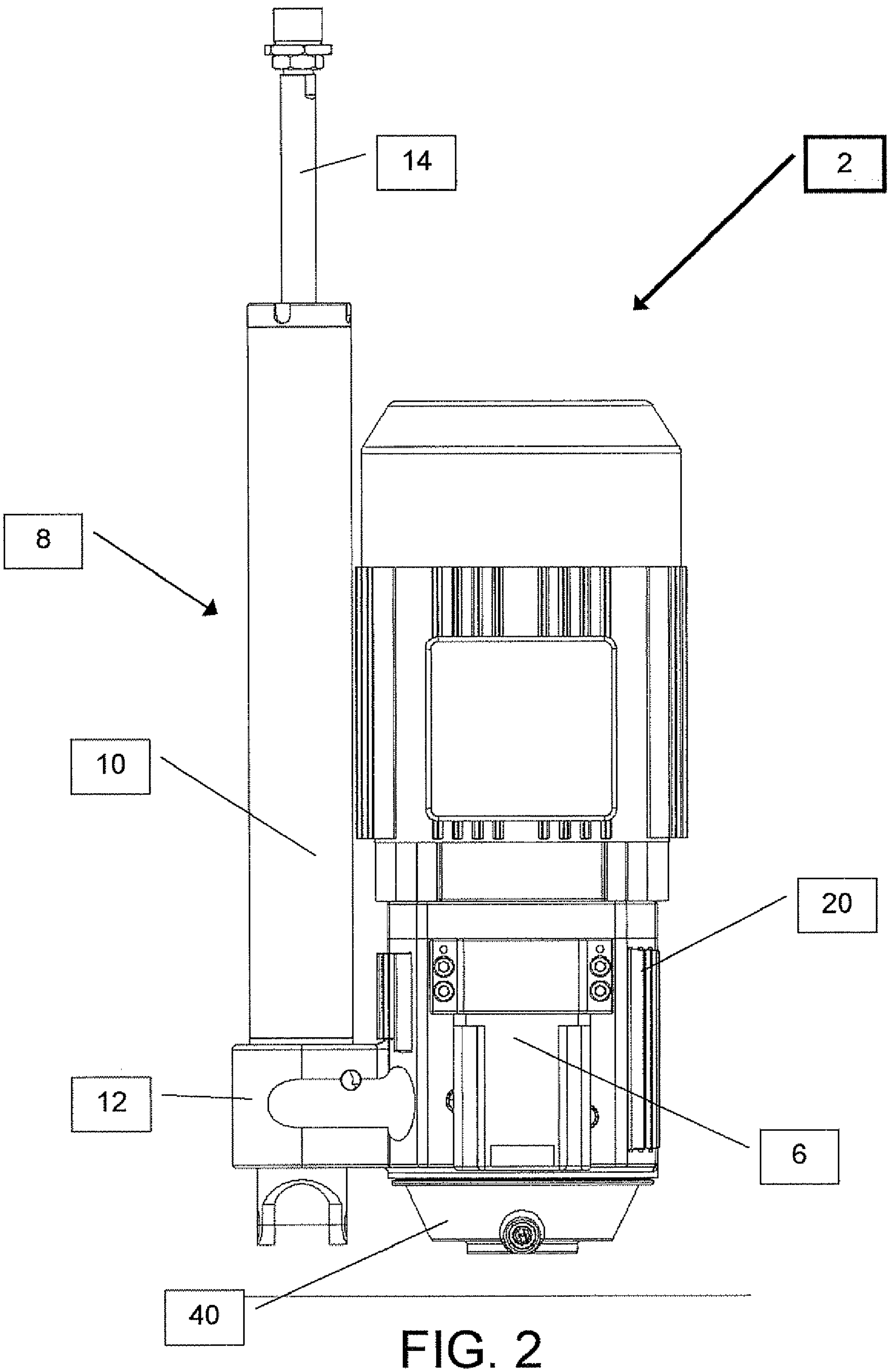
FIG. 2 is a top elevation of the embodiment of FIG. 1.
Figure 3:
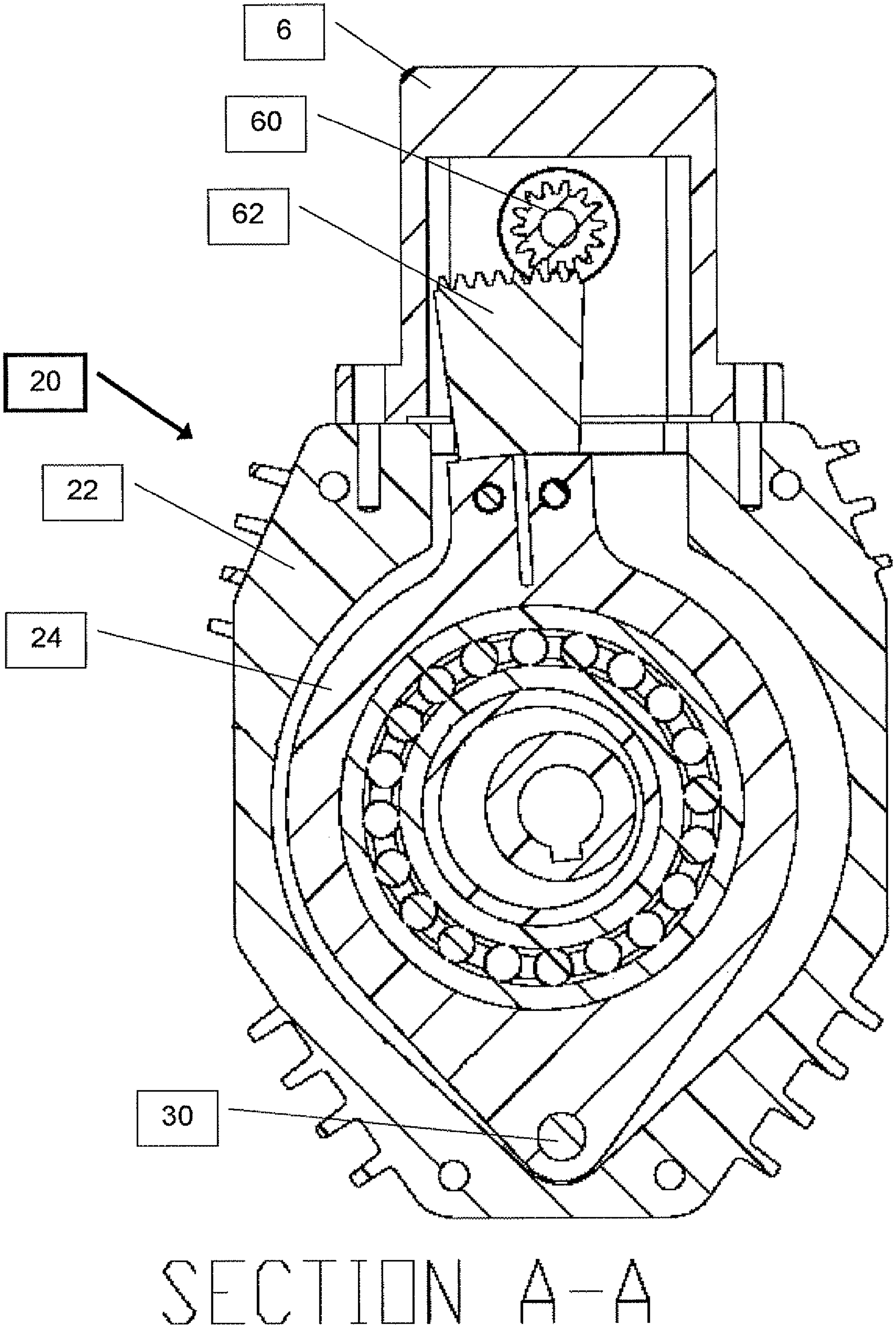
FIG. 3 is a cross-sectional view of the embodiment of FIG. 1 taken along line A-A, showing the stator adjusted toward the left side of the pump housing.

Referring now to the drawings, FIGS. 1 and 2 illustrate side and top elevations, respectively, of the exterior of a preferred embodiment of the hydraulic linear actuator system 2 of the present invention. Seen here are the drive motor 4, the stepper motor housing 6 that houses the stepper motor that affects adjustment of the configuration of the pump, as will be discussed below, the linear actuator 8, and the pump 20. Attached to the pump 20 is the fluid expansion reservoir 40, which will be discussed below.

The drive motor is preferably an AC electric motor. However, it should be noted that substantially any drive device such as, but not limited to, DC electric motors, and internal combustion engines, may be used to drive the pump.

The linear actuator 8 may be a hydraulic cylinder and piston actuator, as is illustrated herein, in which the actuator cylinder 10 is rigidly attached to the pump 20 via the actuator attachment extension 12 of the pump 20 that is configured with fluid passageways which provide fluid communication between the pump 20 and the actuator cylinder 10. It will be appreciated that the actuator 8 need not be attached to the pump 20 and that fluid communication may be provided by substantially any method known in the art such as, but not limited to, hoses, tubes, pipes, and any other suitable fluid conduit. It will also be appreciated that substantially any hydraulically driven device may be associated with the pump 20 of the present invention.

In a preferred embodiment described herein, the pump 20 illustrated is a rotary vane pump configured with a controllably variable pumping assembly. It should be noted, however, that the principles of the present invention may be applied to equal advantage to piston pumps as well. As seen in FIGS. 3-6 the variable pumping assembly, which is deployed within the pump housing 22, includes a displaceable stator 24 and a rotor 26 with a plurality of vanes 28 deployed within the stator 24. The stator 24 is configured so as to pivot about the pivot shaft 30, while the rotor 26 rotates in a static position. Therefore, the positional relationship between the stator 24 and the rotor 26 may be adjusted. As the positional relationship between the stator 24 and the rotor 26 is adjusted, the position of the working pump volume 32 within the stator 24 is varied, as is illustrated clearly in FIGS. 4-6. This also varies the positional relationship of the working pump volume 32 to the inlet/outlet ports 34 and 36. The ports 34 and 36 are referred to herein as inlet/outlet ports because their role changes with the direction of fluid flow through the pump. With regard to the discussion herein, the rotor is considered to be rotating in a clockwise direction (see arrow 38).

Figure 4:
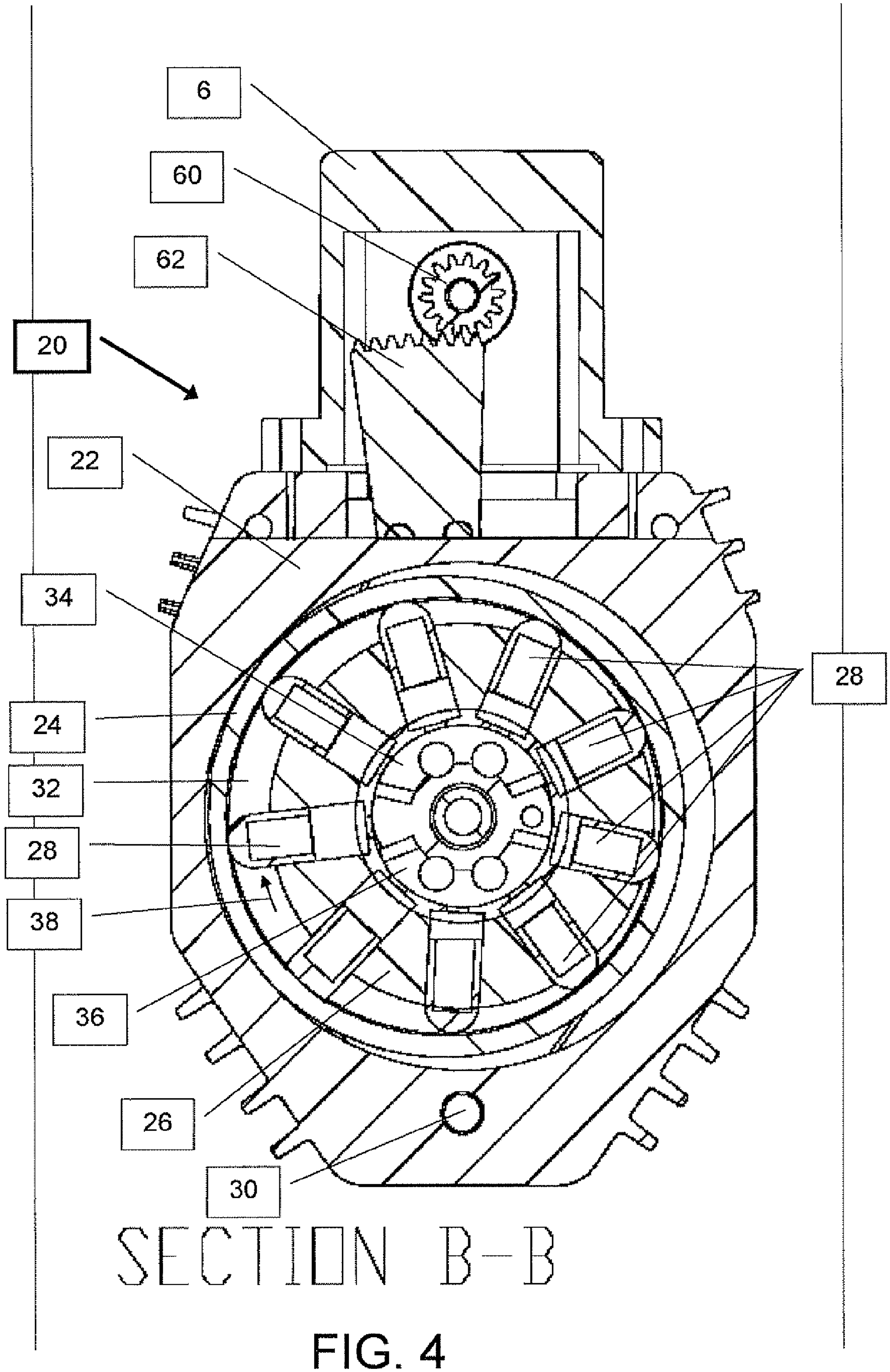
FIG. 4 is cross-sectional view of the embodiment of FIG. 1 taken along line B-B, showing the stator adjusted toward the left side of the pump housing.

In FIG. 4, the stator 24 is displaced to the far left and the majority of the working pump volume 32 is to the left of the rotor 26. Therefore, fluid is drawn into the working pump volume 32 during an expansion stroke, through inlet/outlet port 36, which is now acting as the inlet port. As pump comes to an exhaust stroke the fluid is forced out of the working pump volume 32 through inlet/outlet port 34, which is now acting as the outlet port.

Figure 5:
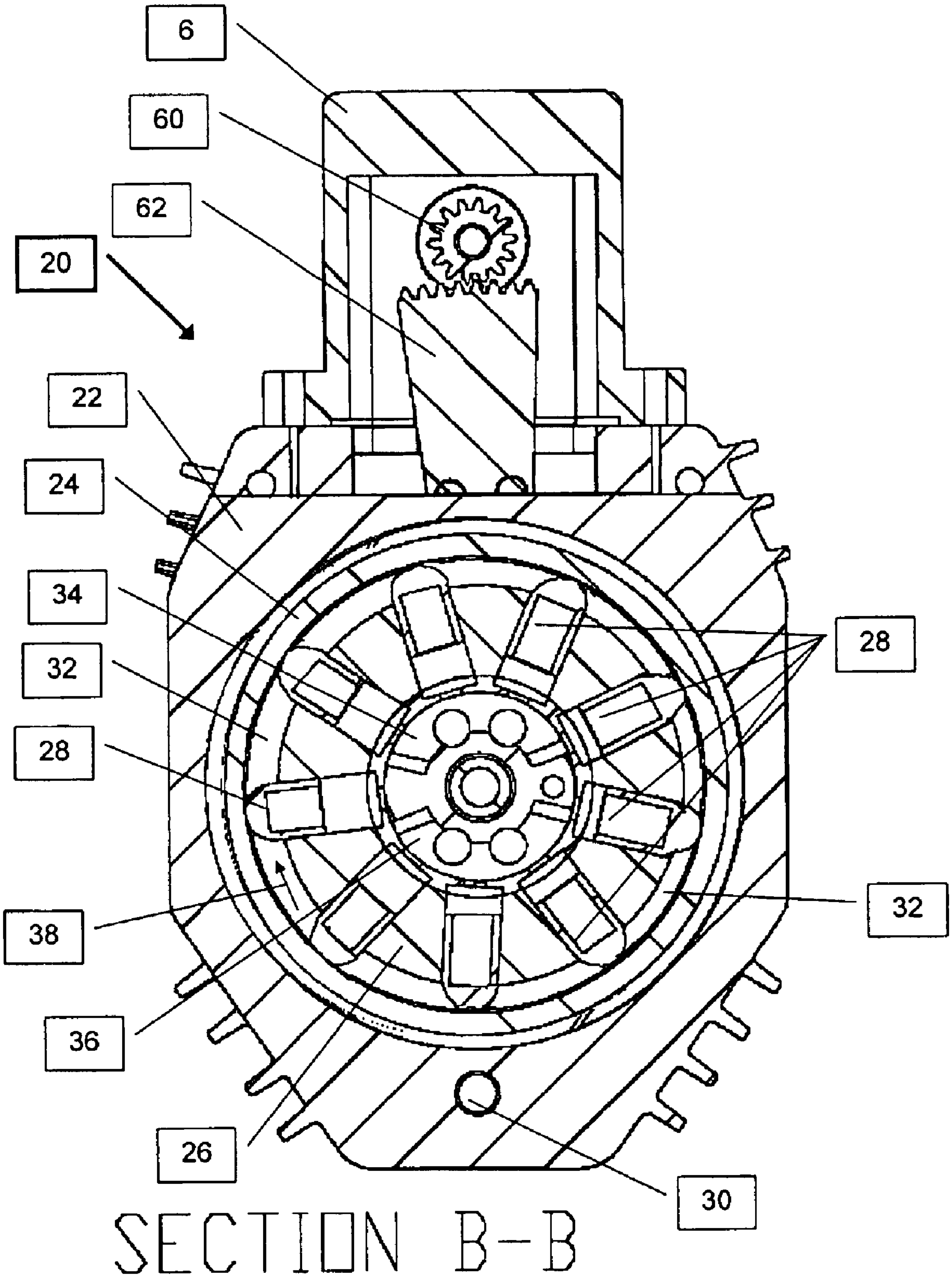
FIG. 5 is cross-sectional view of the embodiment of FIG. 1 taken along line B-B, showing the stator adjusted toward the right side of the pump housing.

In FIG. 5, the stator 24 is substantially centrally deployed and the working pump volume 32 is substantially evenly distributed around the rotor 26. Therefore, there are neither expansion nor exhaust strokes and substantially no fluid is drawn in, or forced out, of the working pump volume 32 through either of the inlet/outlet ports 34 and 36. In this “neutral” position, a non-flow state is achieved within the hydraulic system.

Figure 6:
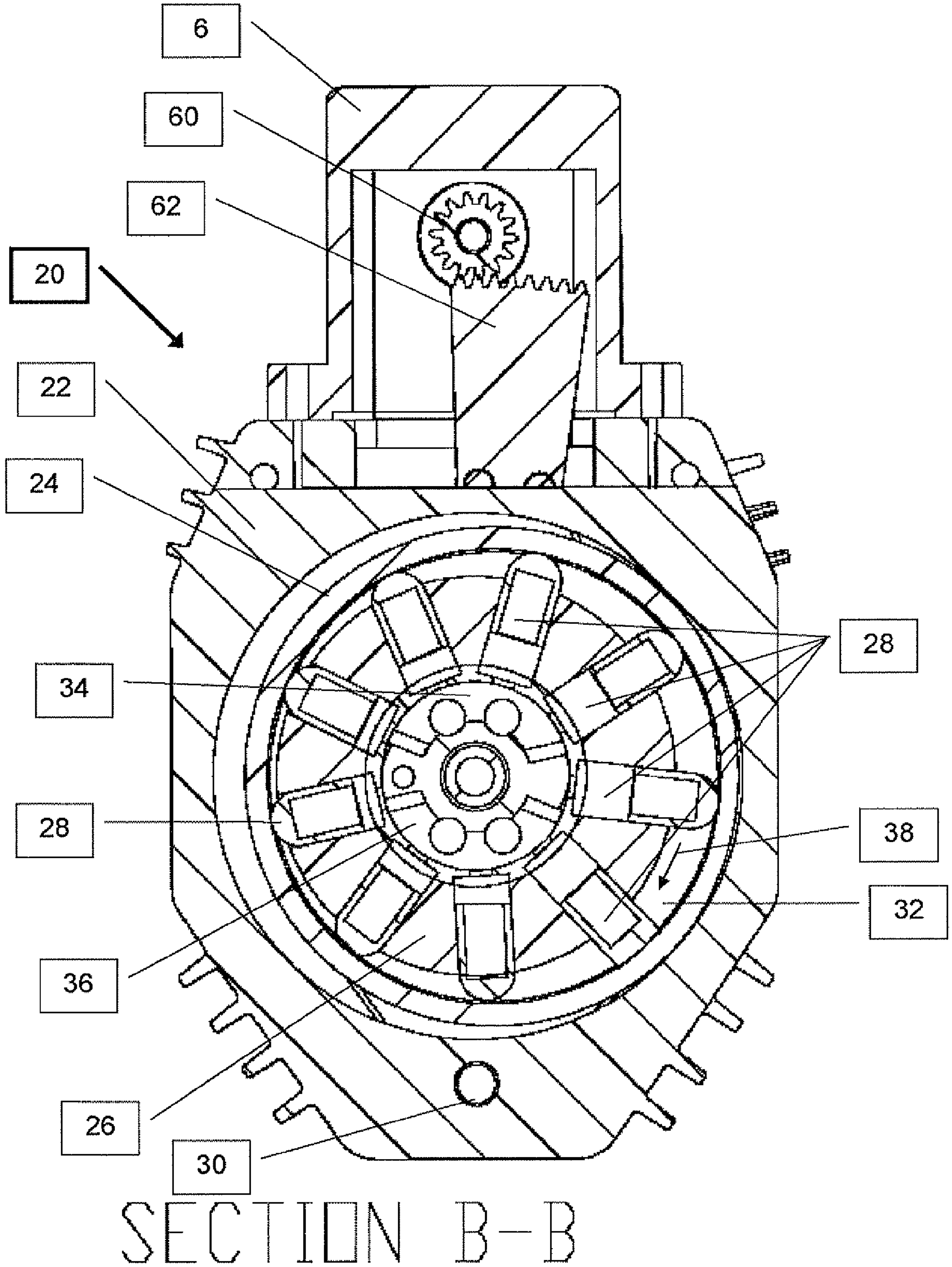
FIG. 6 is cross-sectional view of the embodiment of FIG. 1 taken along line B-B, showing the stator adjusted to the neutral position.

In FIG. 6, the stator 24 is displaced to the far right and the majority of the working pump volume 32 is to the right of the rotor 26. Therefore, fluid is drawn into the working pump volume 32 during an expansion stroke, through inlet/outlet port 34, which is now acting as the inlet port. As pump comes to an exhaust stroke the fluid is forced out of the working pump volume 32 through inlet/outlet port 36, which is now acting as the outlet port.

Thusly configured, the speed and direction of fluid flow through the pump 20, and therefore through the system, is controlled by adjusting the positional relationship between the stator 24 and the rotor 26. Due to the location of the inlet/outlet ports, when the stator 24 is positioned in a central, “neutral” position (FIG. 5), a non-flow state is achieved within the hydraulic system. As the stator 24 is displaced away from the neutral position in a first direction, for example to the left (FIG. 4), a forward flow state is achieved. As the stator 24 is displaced away from the neutral position in a second direction, for example to the right (FIG. 6), a reverse flow state is achieved. It will be appreciated that the further away from the neutral position the stator is displaced, the more fluid will be moved though the pump 20. The amount of fluid moving through the pump affects the speed and distance of actuator displacement. It will be understood that direction of rotor rotation, and which direction of fluid flow is considered to forward and reverse flow states are considered to be design considerations, and examples used herein are not to be considered as limitations.

Adjustment of the position of stator 24 is affected by a bi-directional stepper motor (not shown here) that is housed within the stepper motor housing 6 and controlled by a control system that includes the position controller 64. The stepper motor drives spur 60, which interacts with spur gear section 62 that extends from the stator 24. Configured thus, speed and direction of rotation of the stepper motor affects the speed and direction of stator 24 displacement. As illustrated herein, rotation of the stepper motor in a clockwise direction will displace the stator 24 to the left and counter-clockwise rotation will displace the stator 24 to the right. It will be appreciated that while the preferred embodiment of the present invention described herein refers to the use of a stepper motor to adjust the position of stator 24, this is not intended as a limitation to the scope of the present invention. Therefore, variant embodiments in which adjustment of the position of stator 24 is directly affected by another drive device such as, but not limited to, a bi-directional motor, or a unidirectional motor in conjunction with a direction changeable gear train.

Figure 9:
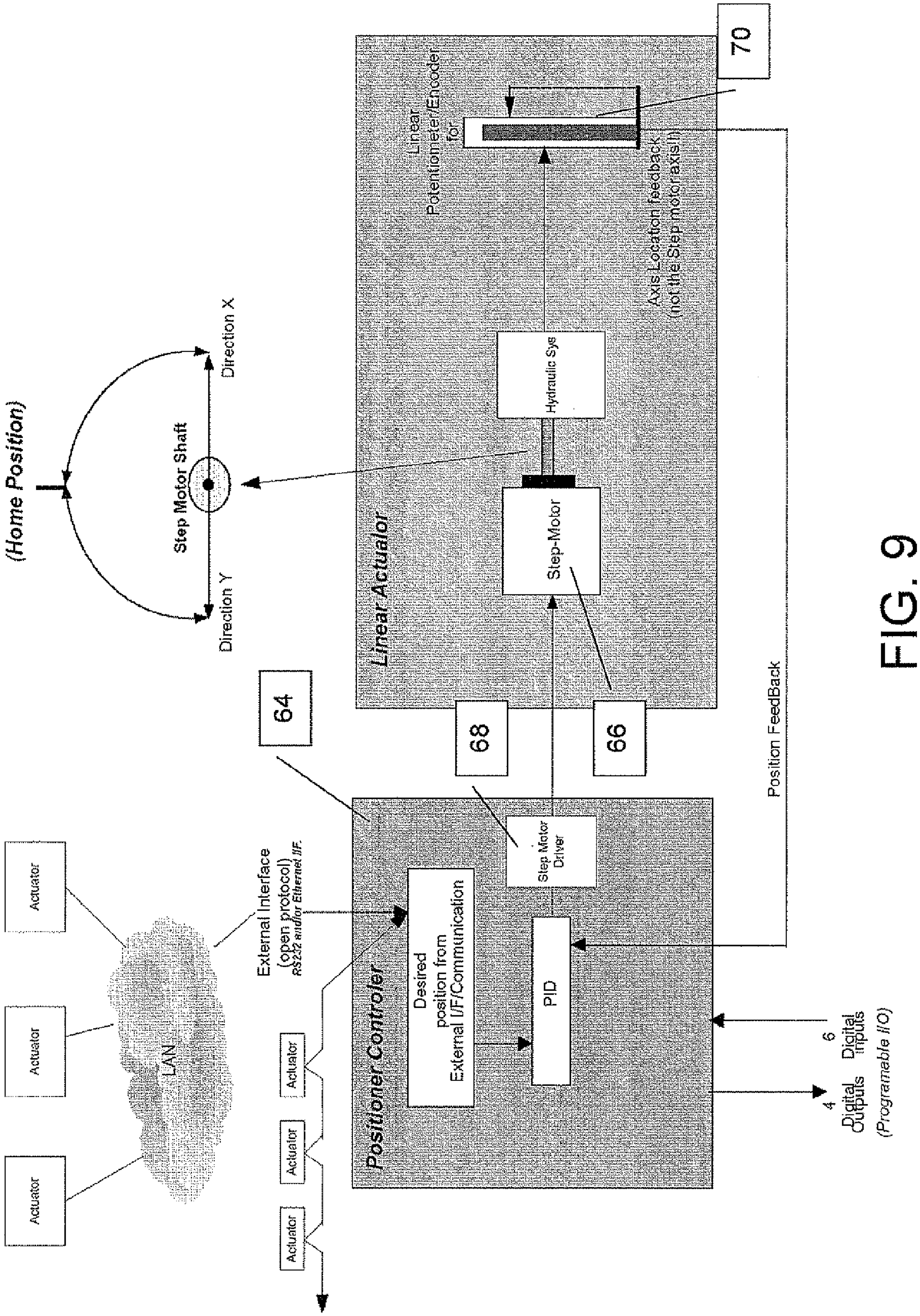
FIG. 9 is a block diagram of a preferred embodiment of a control system for the linear actuator constructed and operative according to the teachings of the present invention.

The speed and rotational direction of the stepper motor is controlled by the position controller 64 as illustrated in FIG. 9. In this embodiment of the present invention, when the position controller receives a command to bring the hydraulic linear actuator 8 to a desired position, the current position of the hydraulic linear actuator 8 is determined based on feedback from the feedback system that includes the optical encoder 70, which is associated with the hydraulic linear actuator 8. It should be noted that feedback regarding the position of the hydraulic linear actuator 8 may be supplied by a linear potentiometer in instead of, or in addition to, the optical encoder. Based on the current position of the hydraulic linear actuator 8 and the speed at which the change of position is to be affected, the rotational direction and number of steps the stepper motor 66 must take, and the rate at which the step must be taken is determined. The pulse generator included in the stepper motor driver 68 then delivers the appropriate pulses, at the appropriate rate, thereby causing the stepper motor 66 to turn the necessary amount in order to bring the stator 24 to the required position to affect the desired position of the hydraulic linear actuator 8. It will be appreciated that in embodiments of the present invention which have remote actuators, that is, actuators that are not directly attached to the pump 20, the control system may be configured with COM ports to provide external connection access to the control system.

It is noteworthy that, unlike systems of prior art that utilize stepper motors and track position bases on the number and direction of step taken, the present invention uses the features of the stepper motor 66 solely for the purpose of controlling the direction and amount of stator 24 displacement and the speed at which the displacement occurs. The position of the hydraulic linear actuator 8 is monitored by a positioning system that includes the encoder 66 which provides position feedback to the position controller 64. This provides a more accurate indication of the true position of the hydraulic linear actuator 8, since the rotation of the stepper motor 66 is not directly related to the displacement of the hydraulic linear actuator 8. Rather, rotation of the stepper motor 66 is directly related to the position of the stator 24 which in turn affect displacement of the hydraulic linear actuator 8.

It will be appreciated that the use of a hydraulic cylinder and piston actuator in a closed hydraulic system present the problem of the volume differential between the two sides of the piston since the one side includes the actuator rod 14 (FIGS. 1 and 2). One way to solve this problem is the inclusion of a fluid expansion reservoir 40 and a valve 42 to control the flow of fluid into and out of the fluid expansion reservoir 40. Another solution could include configuring the hydraulic linear actuator 8 with two actuator rods 14, one extending to each side of the piston, thereby effectively eliminating the volume differential between the two sides.

As described above, the direction of fluid flow through the hydraulic pump of the present invention is controlled by displacement of the stator 24. Therefore, as illustrated in the schematic views of FIGS. 7 and 8, the inlet and outlet ports of the pump 20 alternately act as upstream and downstream ports such that when the first port 44 acts as the upstream port the second port 46 acts as the downstream port, and when the first port 44 acts as the downstream port the second port 46 acts as the upstream port. Therefore, the valve 42, preferably a shuttle valve as illustrated herein, maintains fluid communication between the fluid expansion reservoir 40 and which ever of the first 44 and second 46 ports is acting as the downstream port at the time. That is, the valve 42 is configured to respond to a pressure differential within the hydraulic system and maintains fluid communication between the fluid expansion reservoir 40 and the low-pressure side of the pump 20. It should be noted the while the valve 42 is preferably a shuttle valve, the use of any suitable valve configuration is within the scope of the present invention.

Figure 7:
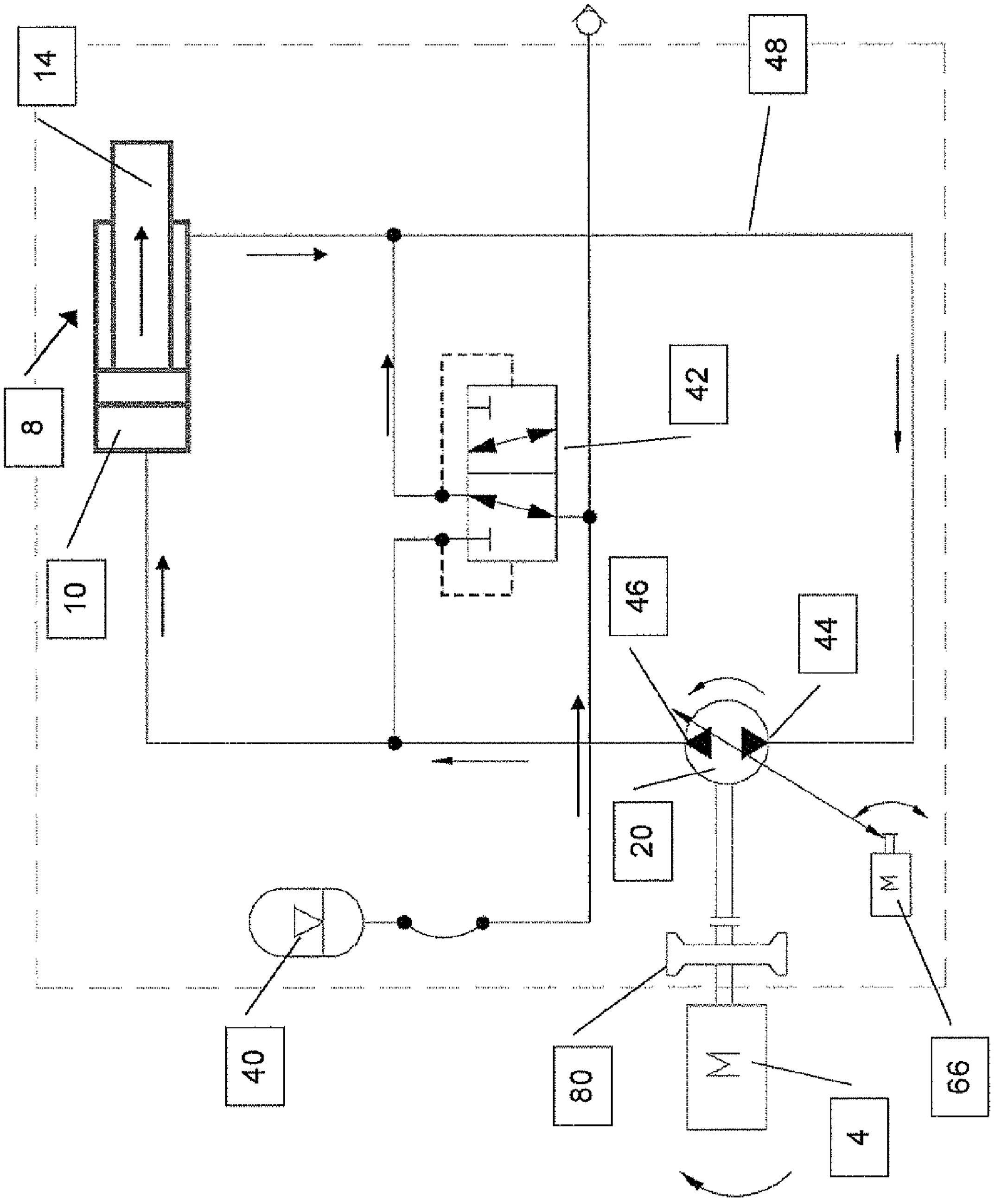
FIG. 7 is a schematic of a preferred hydraulic circuit constructed and operative according to the teachings of the present invention, showing the shuttle valve deployed in a fluid supply state.

FIG. 7 illustrates the fluid flow during an expansion stroke of the hydraulic linear actuator 8. As mentioned above, the amount of fluid displaced from the cylinder on this side of the piston is insufficient to fill the hydraulic volume of the cylinder on the other side of the piston. Therefore, the shuttle valve 42 is positioned to allow fluid to flow from the fluid expansion reservoir 40 into the main flow stream 48 of the hydraulic circuit, on the downstream side of the pump 20. In this case, port 44 is acting as the downstream port.

Figure 8:
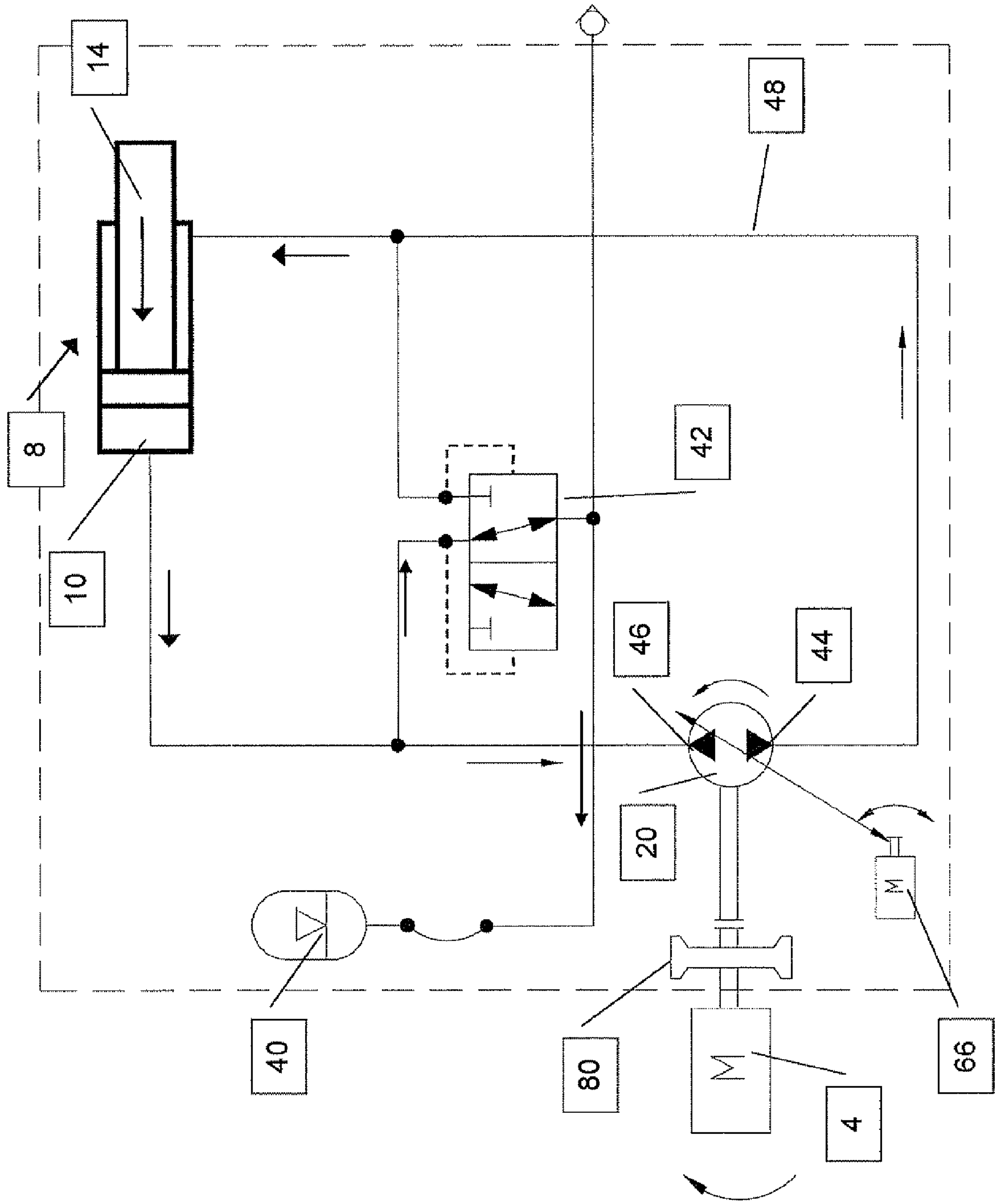
FIG. 8 is a schematic of a preferred hydraulic circuit constructed and operative according to the teachings of the present invention, showing the shuttle valve deployed in a fluid reception state.

FIG. 8 illustrates the fluid flow during a retraction stroke of the hydraulic linear actuator 8. Here, the amount of fluid displaced from the cylinder is more than is required to fill the hydraulic volume of the cylinder on the other side of the piston. Therefore, the shuttle valve 42 is positioned to allow fluid to flow from the main flow stream 48 of the hydraulic circuit into the fluid expansion reservoir 40, on the downstream side of the pump 20. In this case, port 46 is acting as the downstream port.

It will be appreciated that in a preferred embodiment of the present invention, the fluid expansion reservoir 40 is closed, that is, not vented, thereby maintaining the hydraulic system as a closed system. Optionally, the fluid expansion reservoir 40 may be pressurized, preferably to a pressure of 2 atmospheres.

Another optional feature of the present invention is the deployment of a flywheel 80 associated with the drive motor 4 as is known in the art when using a device that rotates in a single direction at a substantially constant velocity. This provides the system of the present invention a distinct energy usage advantage over systems using bi-directional drive motors in which a flywheel would be counter productive.

It will be appreciated that the above descriptions are intended only to serve as examples and that many other embodiments are possible within the spirit and the scope of the present invention.

What is claimed is:

1. A self-contained hydraulic actuator system comprising;

(a) a drive motor configured to rotate at a substantially constant velocity;

(b) a hydraulic pump driven by said drive motor;

(c) a hydraulic linear actuator in fluid communication with said hydraulic pump so as to be actuated in a first direction by a forward flow state and in a second direction by a reverse flow state;

(d) a control system associated with said hydraulic pump, said control system configured to control adjustment of said hydraulic pump between said forward flow state, a non-flow state and said reverse flow state, and said control system includes a bi-directional motor such that a speed and direction of said adjustment is affected by said bi-directional motor; and (e) a positioning system configures to provide positional information regarding said hydraulic linear actuator.

2. The self-contained hydraulic actuator system of claim 1, wherein said hydraulic pump includes a controllably variable pumping assembly such that said adjustments includes a variation of said controllably variable pumping assembly.

3. The self-contained hydraulic actuator system of claim 1, wherein said hydraulic pump includes a stator and a rotor deployed within said stator and said variation of said controllably variable pumping assembly includes adjusting a positional relationship between said stator and said rotor.

4. The self-contained hydraulic actuator system of claim 2, wherein said hydraulic pump is a vane pump.

5. The self-contained hydraulic actuator system of claim 1, wherein said positioning system includes a position feedback system configured to provide position information regarding said hydraulic linear actuator.

6. The self-contained hydraulic actuator system of claim 4, wherein said position feedback system includes at least one of an optical encoder and a linear potentiometer associated with said actuator.

7. The self-contained hydraulic actuator system of claim 1, wherein said fluid communication between said hydraulic pump and said actuator is via a closed hydraulic system.

8. The self-contained hydraulic actuator system of claim 6, further including:

(a) a fluid expansion reservoir; and (b) a valve configuration configured so as to maintain fluid communication between said fluid expansion reservoir and a downstream port of said hydraulic pump.

9. The hydraulic actuator system of claim 7, wherein said hydraulic pump is configured with first and second ports, and said first and second ports alternately act as upstream and downstream ports such that when said first port acts as said upstream port said second port acts as said downstream port, and when said first port acts as said downstream port said second port acts as said upstream port, therefore, said valve configuration maintains said fluid communication between said fluid expansion reservoir and one of said first and second ports, dependent on which of said first and second ports is acting as said downstream port.

10. The hydraulic actuator system of claim 7, wherein said fluid expansion reservoir is not vented.

* * * * *